(12) United States Patent
Bouvier

(10) Patent No.: US 9,136,557 B2
(45) Date of Patent: Sep. 15, 2015

(54) SEMI-AUTOMATIC METHOD FOR MANUFACTURING AN ELECTROCHEMICAL LI-ION BATTERY

(75) Inventor: Michael Bouvier, Varces Allieres et Risset (FR)

(73) Assignee: Commissariat á l'énergie atomique et aux énergies alternatives, Paris (FR)

( * ) Notice: Subject to any disclaimer, the term of this patent is extended or adjusted under 35 U.S.C. 154(b) by 113 days.

(21) Appl. No.: 14/118,033

(22) PCT Filed: May 29, 2012

(86) PCT No.: PCT/EP2012/059948
§ 371 (c)(1),
(2), (4) Date: Nov. 15, 2013

(87) PCT Pub. No.: WO2012/163881
PCT Pub. Date: Dec. 6, 2012

(65) Prior Publication Data
US 2014/0082930 A1    Mar. 27, 2014

(30) Foreign Application Priority Data

May 31, 2011    (FR) ..................................... 11 54767

(51) Int. Cl.
*H01M 2/14*    (2006.01)
*H01M 10/052*    (2010.01)
*H01M 2/16*    (2006.01)
(Continued)

(52) U.S. Cl.
CPC .......... *H01M 10/052* (2013.01); *H01M 2/1673* (2013.01); *H01M 2/18* (2013.01); *H01M 10/044* (2013.01); *H01M 10/0525* (2013.01);
(Continued)

(58) Field of Classification Search
CPC ........... H01M 10/044; H01M 10/052; H01M 10/0525; H01M 10/0585; H01M 2/1673; H01M 2/18; Y02E 60/122; Y10T 29/49108
See application file for complete search history.

(56) References Cited

U.S. PATENT DOCUMENTS 5,498,489 A    3/1996  Dasgupta et al.
2001/0014366 A1    8/2001  Hammond
(Continued)

FOREIGN PATENT DOCUMENTS

EP    1 177 591    2/2002
EP    2 317 594    5/2011
(Continued)

OTHER PUBLICATIONS

International Search Report Issued Jul. 13, 2012 in PCT/EP12/059948 Filed May 29, 2012.
(Continued)

*Primary Examiner* — Patrick Ryan
*Assistant Examiner* — Ben Lewis
(74) *Attorney, Agent, or Firm* — Oblon, McClelland, Maier & Neustadt, L.L.P.

(57) ABSTRACT

A semi-automatic method for making a Li-ion electrochemical accumulator according to which a continuous electrolytic separator strip is automatically wound on two-sided electrodes manually and alternately stacked according to their polarity. By the method, it is not necessary to assemble or manually cut out each electrolytic separator inserted between two adjacent electrodes in the stack and of opposite polarity.

10 Claims, 6 Drawing Sheets

Figure 1A:
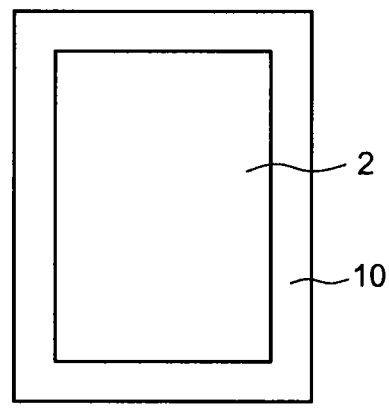

(51) Int. Cl.
*H01M 2/18* (2006.01)
*H01M 10/04* (2006.01)
*H01M 10/0525* (2010.01)
*H01M 10/0585* (2010.01)

(52) U.S. Cl.
CPC .......... *H01M10/0585* (2013.01); *Y02E 60/122* (2013.01); *Y10T 29/49108* (2015.01)

(56) References Cited

U.S. PATENT DOCUMENTS

| | | |
|---|---|---|
| 2002/0160257 A1 | 10/2002 | Lee et al. |
| 2007/0184350 A1 | 8/2007 | Kim et al. |
| 2010/0261047 A1 | 10/2010 | Kim et al. |
| 2011/0104572 A1 | 5/2011 | Ahn et al. |
| 2011/0146064 A1* | 6/2011 | Feaver et al. ............ 29/623.2 |
| 2011/0217586 A1 | 9/2011 | Kim et al. |

FOREIGN PATENT DOCUMENTS

| | | |
|---|---|---|
| KR | 2001-0082059 A | 8/2001 |
| KR | 10-2008-0036250 A | 4/2008 |
| WO | WO 00/20280 A1 | 4/2000 |
| WO | 2004 097971 | 11/2004 |
| WO | 2007 021083 | 2/2007 |
| WO | 2008 130175 | 10/2008 |

OTHER PUBLICATIONS

Preliminary Search Report issued Nov. 24, 2011 in French Patent Application No. 1154767 with English translation of categories of cited documents.

* cited by examiner

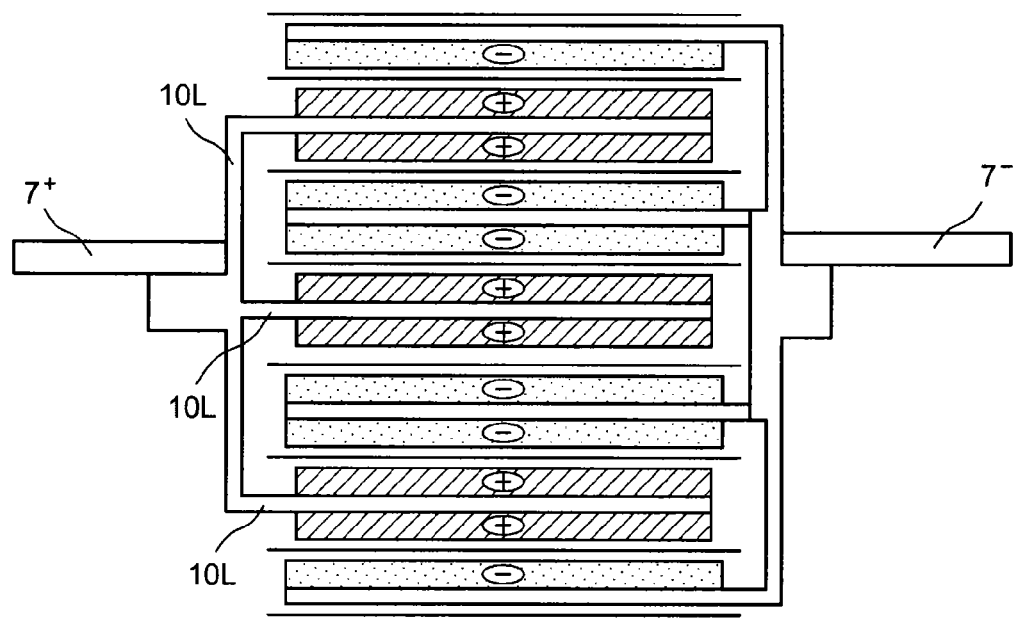
FIG. 5B
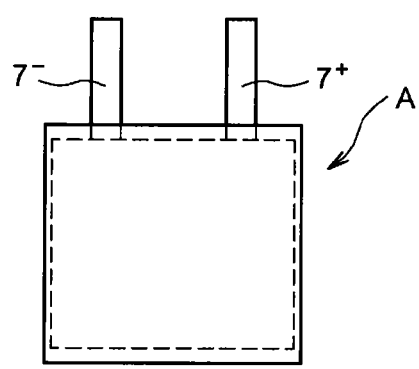 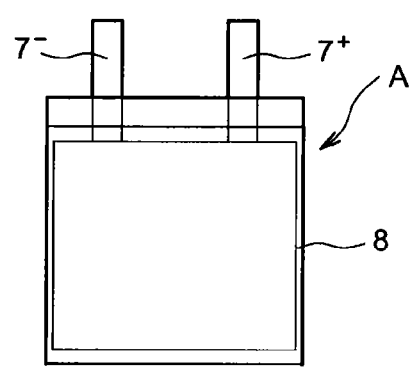
FIG. 6A          FIG. 6B

SEMI-AUTOMATIC METHOD FOR MANUFACTURING AN ELECTROCHEMICAL LI-ION BATTERY

TECHNICAL FIELD

The present invention relates to the field of lithium electrochemical generators which operate according to the principle of insertion or deinsertion, or in other words intercalation-deintercalation of lithium in at least one electrode.

It more particularly relates to a lithium-ion (abbreviated as Li-ion) electrochemical accumulator and it relates to a novel method for making such an accumulator.

PRIOR ART

In order to make Li-ion electrochemical accumulators, it is known to proceed either by winding or by stacking (i.e. a stack).

The stack may either be made entirely manually with the assistance of assembling devices which are used as guides for the different constituents (electrodes, electrolytic separator, current collectors) of the electrochemical core, or in an entirely automated way, which then requires complex and costly equipment.

Winding may, as for it, be accomplished with a much simpler piece of equipment, only requiring an unwinder for unwinding the separators, one plate per electrode of given polarity supported by a current collector, and a mandrel allowing winding of the assembly. The drawback of this presently used method is that the electrodes with their supporting current collectors have to be sufficiently flexible. Indeed, their winding by definition involves their folding according to a more or less substantial curvature angle. Now, depending on the electrode material and on the associated supporting current collector, on their base weight and on their porosity, certain electrodes given with their associated current collector cannot be folded.

Also, up to now, certain electrodes with their associated current collector can only be assembled with an entirely manual stacking method. The drawback of this entirely manual stacking method is that it also requires manual handling of the electrolytic separator with the related individual cutting and stacking steps. Now, intrinsically, the electrolytic separator, the most commonly used in Li-ion accumulators, is in a very thin and very brittle material, typically with a thickness of the order of 1 to 50 µm. Also, any handling entails a risk of perforation and therefore of a subsequent short circuit of the electrochemical core.

Further, the electrodes which cannot be folded and therefore wound are generally warped (flatness defect) and, de facto, the uphold of the different strata, during the stacking phase is delicate. Finally, all the manual steps indicated above are relatively long since it is necessary to position each constituent relatively to all the others: positioning of the electrolytic separator relatively to the positive electrode supported by its collector, the latter relatively to the negative electrode, and so forth for each stratum.

Intermediate solutions for attempting to overcome the aforementioned problems have already been proposed: this is somewhat a mixed stacking and winding method. These solutions are described in patent application KR20080036250 or further patent EP1177591B1. The major drawback of the solution described in these documents is that it consists of stacking and winding electrodes already stacked beforehand with each other. This necessarily involves manual handling of the electrolytic separator for the preliminary stacking. Further, the winding method shown in patent application KR20080036250 seems to be entirely manual, i.e. without applying a winder.

The object of the invention is therefore to propose a method for making a Li-ion electrochemical accumulator which does not have all or part of the aforementioned drawbacks.

In other words, the object of the invention is to propose a novel method for making a Li-ion electrochemical accumulator which is neither an entirely automated winding method, nor a method with entirely manual stacking, nor a mixed winding and stacking method such as those proposed in patent application KR20080036250 or in the aforementioned patent EP1177591B1.

DISCLOSURE OF THE INVENTION

To do this, the object of the invention is a method for making a lithium-ion electrochemical accumulator, comprising the following steps:

a/ making a plurality of electrodes, so-called two-sided electrodes, each comprising an electrically conducting substrate forming a current collector supporting on both of its opposite faces an electrode material of the same given polarity; the plurality of electrodes being divided into two groups, one of the groups comprising electrodes with a polarity opposite to those of the other group, a'/ making two so-called one-sided electrodes, each comprising an electrically conducting substrate forming a current collector supporting on a single one of its faces an electrode material of given polarity, both one-sided electrodes supporting a single electrode material being of same polarity, b/ unwinding an electrolytic separator in the form of a continuous strip from a winder so as to position it on one edge of a mandrel with two parallel edges, c/ manually positioning a first two-sided electrode of one of the groups on the edge of the mandrel parallel to the one on which the continuous separator strip is already positioned, d/ rotating the mandrel so as to wrap the first two-sided electrode of said group and the mandrel with the continuous separator strip, e/ manually positioning a first two-sided electrode of the other group on the edge of the mandrel on which the continuous separator strip is positioned, f/ rotating the mandrel in the same direction as the one of step c/ so as to also wrap the first two-sided electrode of the other group with the continuous separator strip, g/ repeating step c/ to f/ with all the other electrodes made according to steps a/ and a'/ so as to have the latter stacked on the mandrel with each of the one-sided electrodes laid out at one of the ends of the stack, all the electrodes being wrapped with the continuous separator strip, the latter also separating two adjacent electrodes and with a polarity opposite to each other.

In other words, the invention somewhat consists of carrying out automatic winding from a continuous electrolytic separator strip associated with manual positioning of all the electrodes of the final stack without there having been already beforehand manual stacking of one portion of the constituents with distinct separators.

Further in other words, the invention consists of automatically winding a separator in the form of a continuous strip on two-sided electrodes with same polarity, each two-sided electrode and finally each one-sided electrode being manually positioned in order to form a stack.

By automatic, is meant that the stacking may be motor-driven or else driven by hand for example via a crank, but necessarily via a winder.

Thus, as the separator in the form of a continuous strip is initially wound on a winder which itself allows automatic winding of the strip, no manual handling of the separator is required. The two-sided and one-sided electrodes used for applying the invention may be cut out beforehand and because they are stacked manually according to the invention, it is possible to use electrodes for which the material and/or the basis weight and/or the porosity do not allow them to be wound.

Further, by using a winder, it is possible to retain accuracy in positioning the constituents and rapidity in assembling the targeted Li-ion accumulator.

Once step f/ has been carried out, a step for withdrawing the stack from the mandrel is carried out preferably and then a step for cutting out the continuous separator strip at the periphery of the electrodes so as to only leave strip portions of the one-sided electrodes and to individually separate two adjacent electrodes and with a polarity opposite to each other.

According to an advantageous alternative, each unwinding step b/ is carried out from a winder at the output of a slitter-rewinder on which the continuous strip slit is wound beforehand.

Advantageously, each unwinding step b/ is carried out by maintaining the tension on the continuous separator strip between 0.5 and 3 N for a thickness of the latter comprised between 1 and 50 µm. With these values, the strip is maintained permanently tensioned without any risk of perforation of the separator.

According to an advantageous embodiment,
the steps a/ and a'/ are carried out with a portion of each current collector which protrudes from the areas supporting the electrode materials while forming a tab,
steps c/ to g/ are carried out with tabs laid out in a plane substantially orthogonal to the winding direction of the separator;
once step g/ is carried out, a step h/ is carried out during which all the tabs of current collectors of electrodes with a same polarity and with a tab of larger thickness are joined and welded together, both tabs of larger thickness forming the poles of the accumulator.

In order to finalize the accumulator according to the invention, once step h/ is carried out, the stack of the electrodes with the electrolytic separator strip portions individually separating two adjacent electrodes and with opposite polarities relatively to each other, is wrapped with a leak-proof package, while letting the package be crossed by the poles.

The invention also relates to a Li-ion accumulator obtained according to the method defined above, wherein all the negative polarity electrodes are based on graphite and all the positive polarity electrodes are in LiFePO$_4$.

According to an alternative, both poles are laid out, each protruding from a same side of the package.

According to an alternative variant, both poles are laid out each protruding from a different side of the package.

The package of the accumulator according to the invention may be of the flexible type or of the stiff type.

SHORT DESCRIPTION OF THE DRAWINGS

Figure 1B:
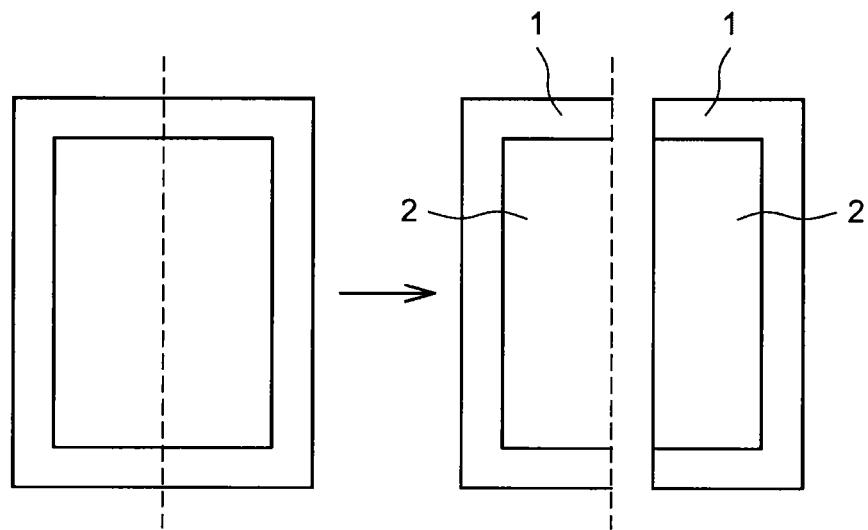
Figure 1C:
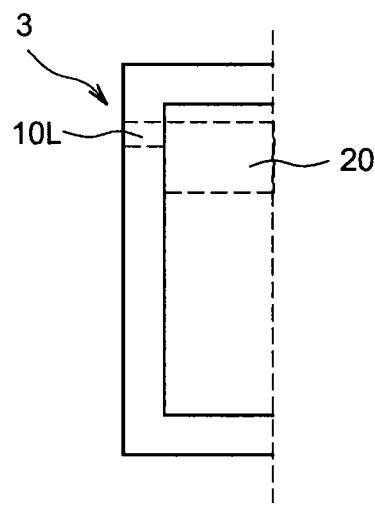
Figure 2A:
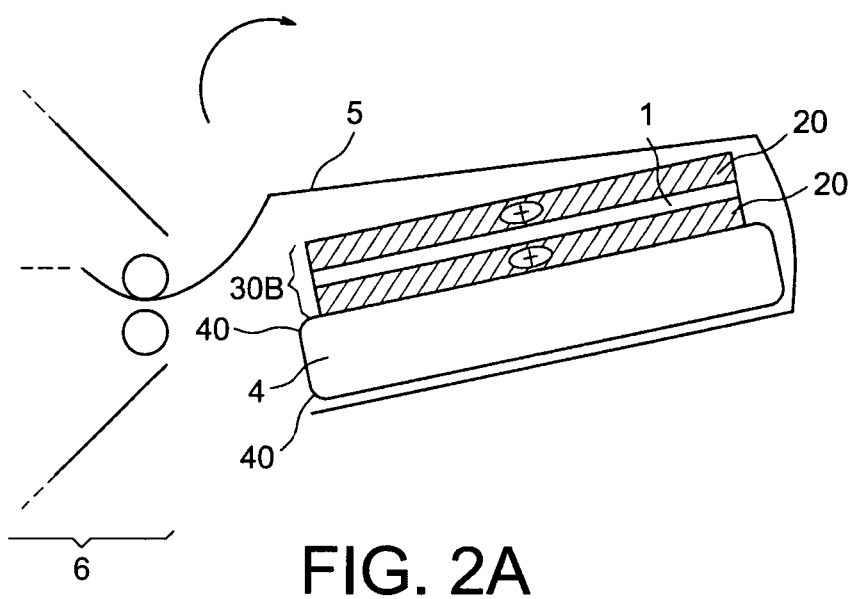
Figure 2B:
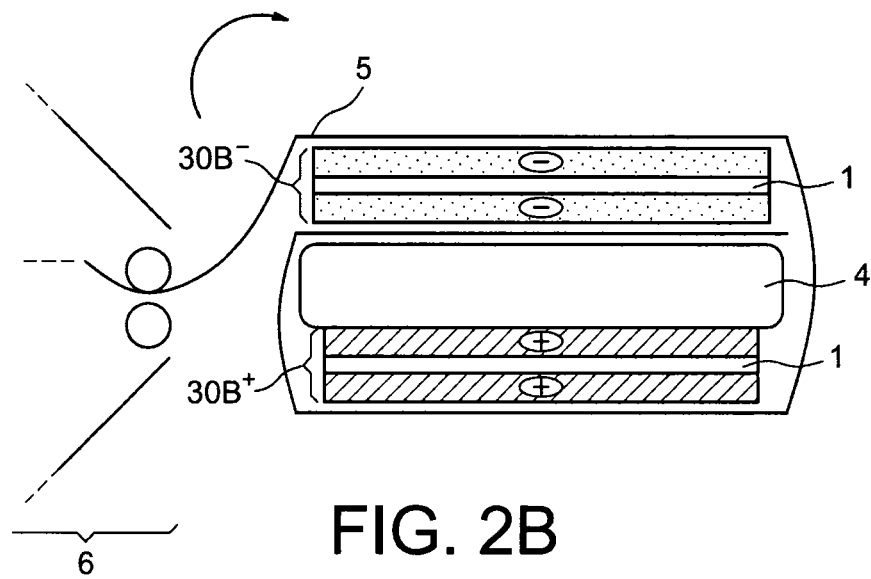
Figure 2C:
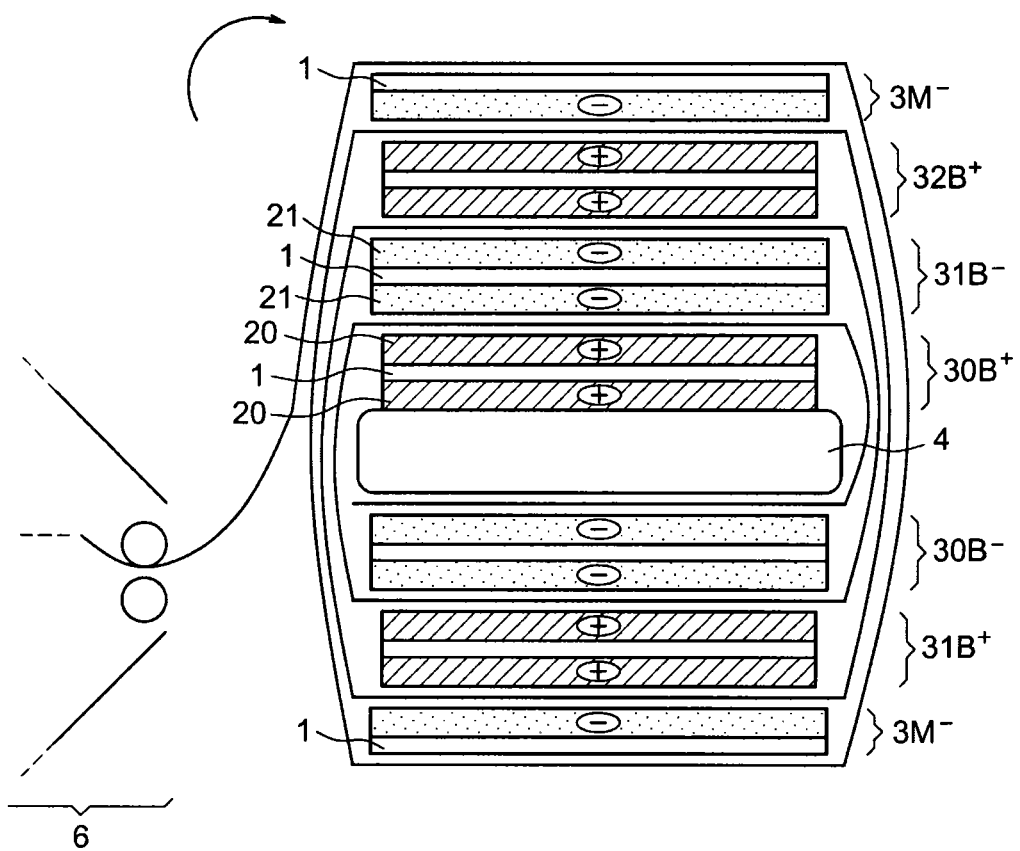
Figure 3:
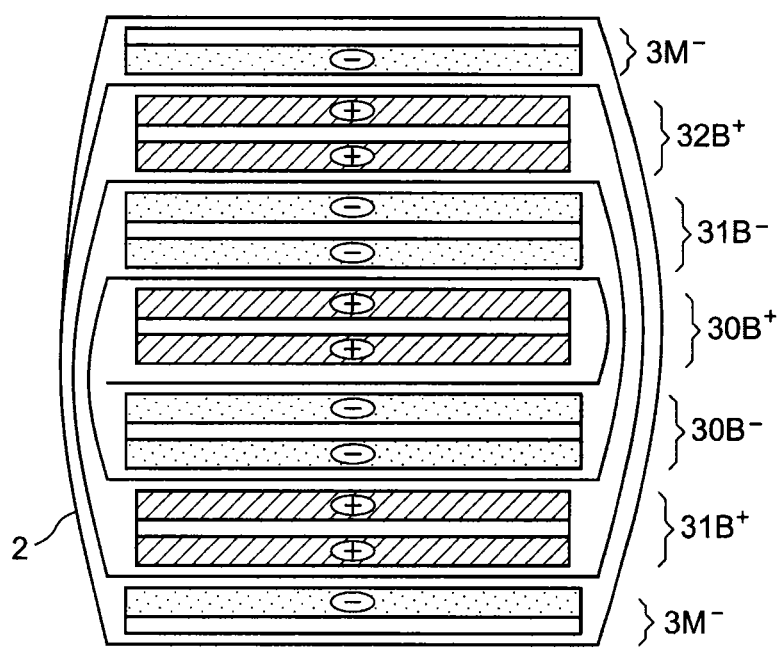
Figure 4:
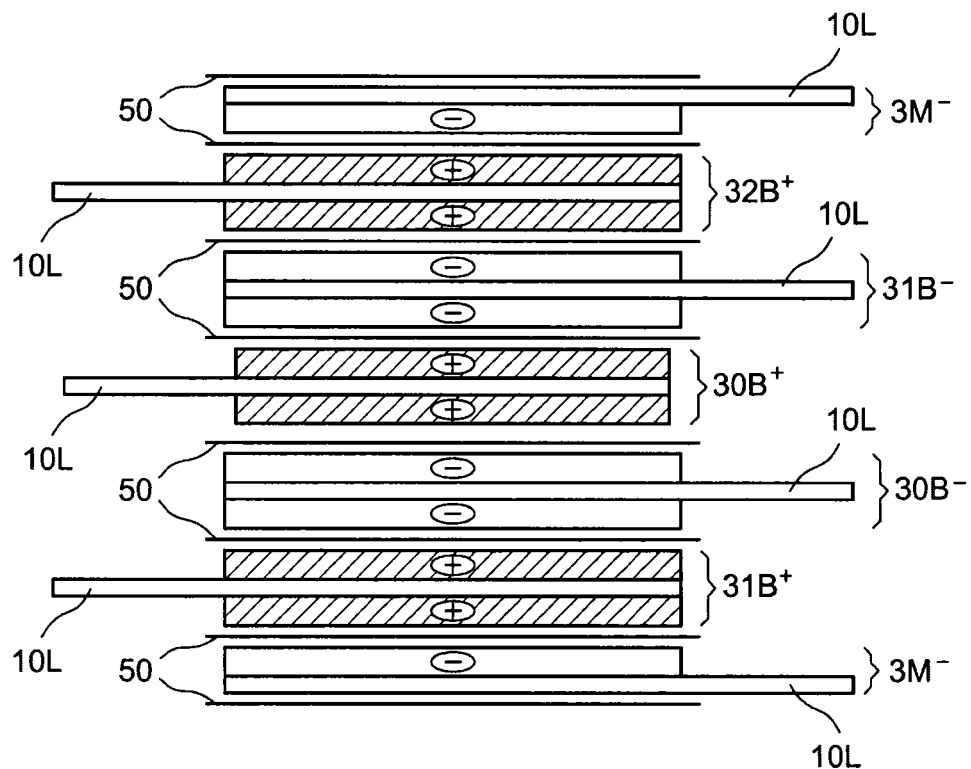
Figure 5A:
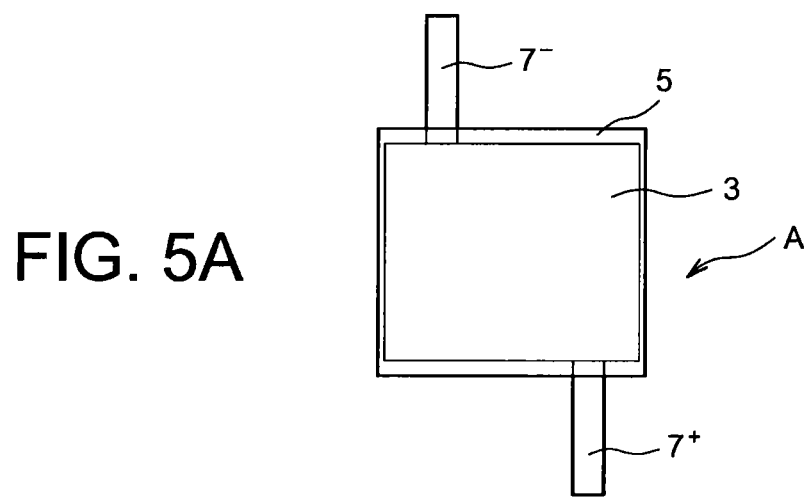

Other advantages and features of the invention will become better apparent upon reading the following detailed description made as an illustration and not as a limitation with reference to the following figures:

FIGS. 1A to 1C show the different steps for making a one-sided or two-sided electrode used in the method for making an Li-ion accumulator according to the invention, FIGS. 2A to 2C show as a front view, the different steps of the method for making a Li-ion accumulator according to the invention, FIG. 3 shows as a front view, the Li-ion accumulator once the steps of the method according to the invention have been carried out and the mandrel removed, FIG. 4 shows as a profile view the Li-ion accumulator of FIG. 3, FIGS. 5A and 5B respectively show as a top and profile view, the accumulator according to FIG. 4, once the step for electric connection to the poles has been carried out but before making a package, FIGS. 6A and 6B show as a top view an electric connection alternative of FIGS. 5A and 5B, respectively before and after making a package.

DETAILED DISCUSSION OF PARTICULAR EMBODIMENTS

It is specified here that in the detailed description, all the current collectors bear the same reference 1 for the sake of clarity: these current collectors may of course be different for a positive electrode and a negative electrode.

It is also specified that in FIGS. 2A to 2C, the curved arrow indicates the direction of rotation of the mandrel.

It is also specified that all the electrodes of the same polarity bear the same reference 20 for the positive ones and 21 for the negative ones.

It is thus considered that all the electrodes of the same polarity are made in the same material, with the same basis weight and the same porosity. It is obvious that distinct materials and/or basis weight and/or porosity may be suitable within the scope of the invention for manually stacked electrodes of same polarity in order to obtain the Li-ion accumulator according to the invention.

Preferably, in order to make an accumulator according to the invention, it is possible to associate:
positive electrodes 20 based on LiFePO$_4$, with a surface capacity of the order of 5 mAh/cm$^2$, coated on one or both faces of an aluminum collector 1 with a thickness from 10 to 40 µm and a width from 100 to 600 mm;
negative electrodes 21, based on graphite, with a surface capacity of the order of 5.5 mAh/cm$^2$, coated on one or both faces of a copper collector 1 with a thickness from 10 to 40 µm and a width from 100 to 600 mm.

First, in order to make these one-sided electrodes 3M$^-$, 3M$^-$ or two-sided electrodes 3B$^-$, 3B$^+$, it is possible to advantageously proceed in the following way. One of the faces or both faces of a substrate forming the current collector 1 are coated with an ink based on a positive or negative electrode material and over a smaller width than that of the collector. A positioned electrode 2 and preferably centered on the current collector 1 is thereby obtained by leaving a peripheral naked frame 10 (FIG. 1A).

Next, the support 1, 2 obtained (FIG. 1B) is slit into two and electrodes 3 are then cut out individually while letting a tab 10$_L$ of a collector 1 extend towards the periphery (FIG. 1B). The thereby obtained electrodes 3 may then be assembled in accordance with the method according to the invention.

It is specified that, by means of a slitter, before the strictly speaking assembling operation, an electrolytic separator is slit at least to the width corresponding to the electrodes 3 themselves all of the same width. Thus several continuous electrolytic separator strips are obtained and each thereby cut continuous strip 5 is wound on a pin at the output of a slitter, a pin which may subsequently be set at the entry of the winder.

In other words, all these cutting and winding steps for an electrolytic separator may be carried out automatically in a same slitter-rewinder.

The continuous electrolytic separator strip 5 is unwound in a first phase from the slitter-rewinder 6 and positioned on one edge 40 of both parallel edges of the mandrel 4 of the machine.

A first positive two-sided electrode $30B^+$ obtained as described above is then manually positioned on the edge 41 of the mandrel parallel to the edge 40 of the mandrel on which the continuous separator strip 5 is already positioned. A rotation of the mandrel 4 is then carried out for thus wrapping under tension both the mandrel 4 and the first positive two-sided electrode $30B^+$ (FIG. 2A).

A rotation of the mandrel 4 by 180° is then carried out and always in the same direction and a first negative two-sided electrode $30B^-$ is then manually positioned, obtained as described above, the continuous separator strip 5 portion being already positioned on the edge 40 of the mandrel 4 (FIG. 2B).

These automatic winding steps are repeated with rotation every time of the mandrel always in the same direction and by 180° while maintaining the separator 5 under tension and by alternately and manually stacking positive $30B^+$ and negative $31B^-$ two-sided electrodes on each other and at the ends of the stack the negative one-sided electrodes $3M^-$, $3M^-$. The complete stack of the electrodes 3 wrapped with the separator 5 is thereby obtained, the latter individually separating two adjacent electrodes and with opposite polarity, i.e. electrodes referenced as $30B^+$, $31B^-$; $31B^-$, $32B^+$; $32B^+$, $3M^-$ on one side of the mandrel 4 and those referenced as $30B^-$, $31B^+$; $31B^+$, $3M^-$ on the other side of the mandrel 4 (FIG. 2C).

The separator strip 5 is then cut at the output of the winder 6 and the obtained stack is withdrawn from the mandrel 4 (FIG. 3).

The separator is actually secured by any means for example a simple adhesive, to the collector tab of the first electrode. In this way, the separator remains in place and is tensioned during withdrawal or removal of the mandrel.

The separator 5 is then cut out at the peripheral of each electrode so as to only leave electrolytic separator portions 50 individually inserted between both electrodes of opposite polarity and above the one-sided electrodes $3M^-$ at the ends of the stack (FIG. 4). This cutting step may be achieved by a suitable cutting means such as a scalpel, a guillotine.

As a separator, provision may be made for a separator in polyvinylidene fluoride (PVDF), in polypropylene (PP) or in polyethylene (PE). The electrolyte ensuring ion conduction between the electrodes may be liquid, for example based on a carbonate or on any other compound which is stable at the concentrate potentials and allowing dissolution of a lithium salt (for example $LiPF_6$).

As better visible in FIG. 4, the tabs $10_L$ of the current collectors initially generated during the step for slitting the electrodes individually extend on one of the sides of the stack which has been left free of the stack of the separator 5. In this FIG. 4, all the tabs $10L^+$ of the current collectors of a positive electrode $30B^+$, $31B^+$, $32B^+$ extend on an edge opposite to the one on which extend the tabs $10L^-$ of the negative electrode current collectors $30B^-$, $31B^{-+}$, $3M^-$, $3M^-$.

The tabs $10L^+$, $10L^-$ of same polarity are then gathered together, in addition to a thicker tab $7^+$, $7^-$, typically comprised between 50 μm and 1 mm thick. All the tabs of a same polarity $10L^-$, $7^-$; $10L^+$, $7^+$ are then welded together, (FIGS. 5A and 5B). These welds may be produced by ultrasound, electric welding or further laser welding. The thicker tabs 7+, 7− form the output electric connections or poles of the Li-ion accumulator according to the invention.

Another alternative embodiment of the poles 7+, 7− of an accumulator according to the invention is shown in FIG. 6A: the poles extend in this case over a same edge of the accumulator A according to the invention.

The obtained Li-ion accumulator may then be packaged with a seal as customarily in a package of the flexible or stiff type, only the tabs 7+, 7− forming the poles protruding out of the package 8 (FIG. 6B).

The invention which has just been described advantageously gives the possibility of assembling an Li-ion accumulator A even with electrodes for which the material and/or the basis weight and/or the porosity do not intrinsically give the possibility of folding them along any curvature and this without having to handle the electrolytic separators manually, i.e. cut them out and assemble them. Further, by means of the method according to the invention, the electrolytic separator as a continuous strip may be maintained tensioned permanently during its unwinding in order to wrap the electrodes, which ensures compact stacking with good cohesion between its different constituents.

Other embodiments may be contemplated without however departing from the scope of the invention. For example, if the illustrated Li-ion accumulator comprises three positive two-sided electrodes, two negative two-sided electrodes and two negative one-sided electrodes, it is of course possible to contemplate the making of an accumulator with identical features but with three negative two-sided electrodes, two positive two-sided electrodes and two positive one-sided electrodes. It is also possible by means of the invention to contemplate other accumulators with different capacity, voltage and energy characteristics.

The invention claimed is:

1. A method for making a lithium-ion electrochemical accumulator, comprising:
   a) making a plurality of two-sided electrodes, each comprising an electrically conducting substrate forming a current collector supporting on its two opposite faces an electrode material of same given polarity; the polarity of electrodes being divided into two groups, one of the groups comprising electrodes with polarity opposite to those of the other group;
   b) making two one-sided electrodes, each comprising an electrically conducting substrate forming a current collector supporting on a single one of its faces an electrode material of given polarity, both one-sided electrodes supporting a single electrode material of the same polarity;
   c) unwinding an electrolytic separator in a form of a continuous strip from a winder to position the electrolytic separator on one edge of a mandrel with two parallel edges;
   d) manually positioning a first two-sided electrode of one of the groups on the edge of the mandrel parallel to the one on which the continuous separator strip is already positioned;
   e) rotating the mandrel to wrap the first two-sided electrode of the group and the mandrel with the continuous separator strip;
   f) manually positioning a first two-sided electrode of the other group on the edge of the mandrel on which the continuous separator strip is positioned;
   g) rotating the mandrel in the same direction as the one of d) to also wrap the first two-sided electrode of the other group with the continuous separator strip;

h) repeating d) to g) with all the other electrodes made according to a) and b) to have the other electrodes stacked on the mandrel with each of the one-sided electrodes laid out at one of the ends of the stack, all the electrodes being wrapped by the continuous separator strip, the separator strip also separating two adjacent electrodes and of opposite polarity relatively to each other.

2. The method for making a lithium-ion accumulator according to claim 1, wherein, once g) is carried out, further comprising removing the stack from the mandrel and then cutting out the continuous separator strip at a periphery of the electrodes to only leave strip portions on the one-sided electrode and to individually separate two adjacent electrodes and with opposite polarity relatively to each other.

3. The method for making a lithium-ion accumulator according to claim 1, wherein each unwinding c) is carried out from a winder at an output of a slitter-rewinder on which the continuous strip slit beforehand is wound.

4. The method for making a lithium-ion accumulator according to claim 1, wherein each unwinding c) is carried out by maintaining tension of the continuous separator strip between 0.5 and 3 N for a thickness of the separator strip between 1 and 50 μm.

5. The method for making a lithium-ion accumulator according to claim 1, wherein:
  a) and b) are carried out with a portion of each current collector which protrudes from the areas supporting the electrode materials while forming a tab;
  d) to h) are carried out with the tabs laid out in a plane substantially orthogonal to the winding direction of the separator;
  once h) is carried out, further comprising i) during which all the tabs of current collectors of electrodes of a same polarity and with a tab of greater thickness are joined and welded together, both tabs of greater length forming the poles of the accumulator.

6. The method for making a lithium-ion accumulator according to claim 5, wherein, once step i) is carried out, the stack of the electrodes with the electrolytic separator strip portions individually separating two adjacent electrodes and of opposite polarity relatively to each other is wrapped in a leak-proof package, while letting the package be crossed by the poles.

7. A Li-ion accumulator obtained according to the method of claim 6, wherein all the electrodes with negative polarity are based on graphite and all the electrodes with positive polarity are in $LiFePO_4$.

8. A Li-ion accumulator obtained according to the method of claim 7, wherein both poles are laid out while protruding from a same side of the package.

9. A Li-ion accumulator obtained according to the method of claim 7, wherein both poles are laid out each protruding from a different side of the package.

10. A Li-ion accumulator obtained according to claim 7, wherein the package is of a flexible type or of a stiff type.

* * * * *